(12) United States Patent
Kurihara

(10) Patent No.: US 10,950,865 B2
(45) Date of Patent: Mar. 16, 2021

(54) NEGATIVE ELECTRODE AGENT FOR NONAQUEOUS ELECTROLYTE SECONDARY BATTERY, NEGATIVE ELECTRODE FOR NONAQUEOUS ELECTROLYTE SECONDARY BATTERY, AND NONAQUEOUS ELECTROLYTE SECONDARY BATTERY

(71) Applicant: TOPPAN PRINTING CO., LTD., Tokyo (JP)

(72) Inventor: Hitoshi Kurihara, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 193 days.

(21) Appl. No.: 15/297,807

(22) Filed: Oct. 19, 2016

(65) Prior Publication Data

US 2017/0040615 A1 Feb. 9, 2017

Related U.S. Application Data

(63) Continuation of application No. PCT/JP2015/005047, filed on Oct. 2, 2015.

(30) Foreign Application Priority Data

Oct. 3, 2014 (JP) .................................. 2014-204667
Apr. 3, 2015 (JP) .................................. 2015-076652

(51) Int. Cl.
*H01M 4/62* (2006.01)
*H01M 4/48* (2010.01)
(Continued)

(52) U.S. Cl.
CPC .......... *H01M 4/628* (2013.01); *H01M 4/386* (2013.01); *H01M 4/48* (2013.01); *H01M 4/483* (2013.01);
(Continued)

(58) Field of Classification Search
CPC ........ H01M 4/48; H01M 4/386; H01M 4/622; H01M 10/052; H01M 2004/027; H01M 4/483; H01M 4/628; Y02T 10/7011
(Continued)

(56) References Cited

U.S. PATENT DOCUMENTS 5,049,275 A * 9/1991 Gillberg-LaForce ........................
B01D 61/38
210/500.27
5,478,676 A * 12/1995 Turi ........................ H01M 4/66
204/279
(Continued)

FOREIGN PATENT DOCUMENTS

CN 103456917 A 12/2013
GB 2 495 951 A 1/2013
(Continued)

OTHER PUBLICATIONS

Shibuya Masanori et al. WO2015098050 (A1)—Jul. 2, 2015 English language machine translation in PDF file attached.*
(Continued)

*Primary Examiner* — Jonathan G Jelsma
*Assistant Examiner* — Omar M Kekia
(74) *Attorney, Agent, or Firm* — Foley & Lardner LLP

(57) ABSTRACT

A negative electrode for nonaqueous electrolyte secondary batteries, a negative electrode agent for nonaqueous electrolyte secondary batteries, which is used therefor, and a nonaqueous electrolyte secondary battery provided with the negative electrode. The negative electrode agent for nonaqueous electrolyte secondary batteries related to the present invention comprises, at least, an active material and a binder wherein the binder contains a first water-soluble polymer of linear polycarboxylate and a second water-soluble polymer of linear polycarboxylic acid. The first water-soluble polymer has a crosslinked structure of high molecular weight, (Continued)

and the second water-soluble polymer has a low molecular weight.

16 Claims, 1 Drawing Sheet

(51) Int. Cl.
*H01M 10/052* (2010.01)
*H01M 4/38* (2006.01)
*H01M 4/02* (2006.01)

(52) U.S. Cl.
CPC ......... *H01M 4/622* (2013.01); *H01M 10/052* (2013.01); *H01M 2004/027* (2013.01); *Y02T 10/70* (2013.01)

(58) Field of Classification Search
USPC ........................................................ 429/217
See application file for complete search history.

(56) References Cited

U.S. PATENT DOCUMENTS

| | | |
|---|---|---|
| 2012/0094178 A1 | 4/2012 | Loveridge et al. |
| 2012/0135308 A1 | 5/2012 | Loveridge et al. |
| 2013/0323586 A1 | 12/2013 | Uezono |
| 2014/0335410 A1 | 11/2014 | Loveridge et al. |
| 2014/0349185 A1* | 11/2014 | Momose ............... H01M 4/623 429/217 |
| 2015/0188125 A1 | 7/2015 | Korgel et al. |

FOREIGN PATENT DOCUMENTS

| | | | |
|---|---|---|---|
| JP | H09-289022 A | 11/1997 | |
| JP | 2002-175803 A | 6/2002 | |
| JP | 2007-157709 A | 6/2007 | |
| JP | 2010-097761 A | 4/2010 | |
| JP | 2013-168323 A | 8/2013 | |
| KR | 10-2013-0134909 A | 12/2013 | |
| WO | WO-2014/015335 A1 | 1/2014 | |
| WO | WO-2014/065407 A1 | 5/2014 | |
| WO | WO2015098050 * | 7/2015 | .......... H01M 10/052 |
| WO | WO2016038682 A1 * | 3/2016 | ........ H01M 10/0525 |

OTHER PUBLICATIONS

Machine English language translation of Ishibashi Mitsuru (WO2016038682 (A1)—Mar. 17, 2016 Nonaqueous electrolyte battery and battery pack (Year: 2016).*
Bogart et al, High capacity lithium ion battery anodes of silicon and germanium, Current opinion in Chemical Engineering, 2013,286-293, Elsevier.
Office Action dated Dec. 11, 2017 in corresponding European application No. 15 847 624.2.
International Search Report issued in International Patent Application No. PCT/JP2015/005047 dated Dec. 28, 2015.
Koo et al., "A Highly Cross-Linked Polymeric Binder for High-Performance Silicon Negative Electrodes in Lithium Ion Batteries," Angew. Chem. Int. Ed. 51(35):8762-8767 (2012).
Extended European Search Report issued in EP Patent Application No. 15847624.2 dated Feb. 20, 2017.
Korean Office Action dated Mar. 15, 2018 in corresponding application No. 10-2016-7023602.
CN Office Action issued in the corresponding Chinese Application Ser. No. 201580023104.7, dated May 8, 2019.

* cited by examiner

NEGATIVE ELECTRODE AGENT FOR NONAQUEOUS ELECTROLYTE SECONDARY BATTERY, NEGATIVE ELECTRODE FOR NONAQUEOUS ELECTROLYTE SECONDARY BATTERY, AND NONAQUEOUS ELECTROLYTE SECONDARY BATTERY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/005047 filed on Oct. 2, 2015, which is based upon and claims the benefit of priority of Japanese Patent Application No. 2014-204667, filed on Oct. 3, 2014, and Japanese Patent Application No. 2015-076652, filed on Apr. 3, 2015, the entire contents of them all are hereby incorporated by reference.

TECHNICAL FIELD

This invention relates to a negative electrode agent for nonaqueous electrolyte secondary batteries, a negative electrode for nonaqueous electrolyte secondary batteries, and a nonaqueous electrolyte secondary battery.

BACKGROUND

Known techniques related to nonaqueous electrolyte secondary batteries (e.g. Li ion secondary batteries) include those described, for example, in PTL 1 and PTL 2. In the PTL 1, it is disclosed to suppress the capacity fading by covering the surface of a metal active material, which contains an active material layer of a negative electrode of nonaqueous electrolyte secondary batteries, with a material having repeating units of alkylene oxide. In PTL 2, it is disclosed that crosslinked polyacrylic acid is used as a binder contained in an active material layer of a negative electrode for nonaqueous electrolyte secondary batteries thereby providing an electrode structure that is less likely to be broken than that of non-crosslinked polyacrylic acid.

CITATION LIST

Patent Literature

PTL 1: JP-A-2007-157709
PTL 2: WO 2014/065407

SUMMARY OF THE INVENTION

Technical Problem

With the technique set out in PTL 1, however, the problems cannot be solved of conduction path breakage, separation from the electrode entailed from the layer breakage into pieces, and peeling between a current collector and the active material layer, which are all caused by the volume change of the active material layer. Hence, satisfactory lifetime characteristics may not be obtained in some cases. With the technique of PTL 2, wherein crosslinked polyacrylic resin is used as a binder, the coverage rate on fine irregularities and the inside of voids of the Si-based active substance surface with the binder lowers, with the increased likelihood that the decomposition of an electrolytic solution occurs accompanied by the consumption of Li ions. Thus, the retention rate as a battery lowers, so that satisfactory lifetime characteristics may not be obtained in some cases.

The present invention focuses attention on such problems as set out above and has for its object the provision of a negative electrode for nonaqueous electrolyte secondary batteries, which is improved and can be even excellent in lifetime characteristics, a negative electrode agent for nonaqueous electrolyte secondary batteries, and a nonaqueous electrolyte secondary cell provided with the negative electrode for nonaqueous electrolyte secondary batteries.

Solution to Problem

To solve the above problem, one embodiment of the invention is directed to a negative electrode agent for nonaqueous electrolyte secondary batteries containing at least an active material and a binder, characterized in that the binder comprises a first water-soluble linear polymer and a second water-soluble linear polymer, the first water-soluble polymer having been crosslinked.

Advantageous Effects of the Invention

According to the one embodiment of the invention, since the crosslinked binder of high molecular weight (first water-soluble polymer) and the non-crosslinked binder of low molecular weight (second water-soluble polymer) are used in combination, there can be obtained an active material layer of higher durability against an internal stress at the time of volume expansion and shrinkage during charge and discharge cycles, and the continuous breakage and formation of SEI (solid electrolyte interphase or solid electrolyte layer) resulting from the repetitions of charge and discharge can be better suppressed. This enables the provision of a negative electrode for nonaqueous electrolyte secondary batteries having improved or even excellent lifetime characteristics, a negative electrode agent for nonaqueous electrolyte secondary batteries used therefor, and also a nonaqueous electrolyte secondary battery provided with the negative electrode for nonaqueous electrolyte secondary batteries.

DESCRIPTION OF REPRESENTATIVE EMBODIMENTS

The embodiments of the invention are now described with reference to the accompanying drawings. It will be noted that in the following detailed description, a number of specified details are described to provide full understanding of the embodiments of the invention. However, it will be apparent that if there are no such specified details, one or more embodiments can be carried out. Besides, for the simplicity of drawings, known structures and devices are shown schematically.

[Overall Configuration of Negative Electrode 1 for Nonaqueous Electrolyte Secondary Battery]

Figure 1:
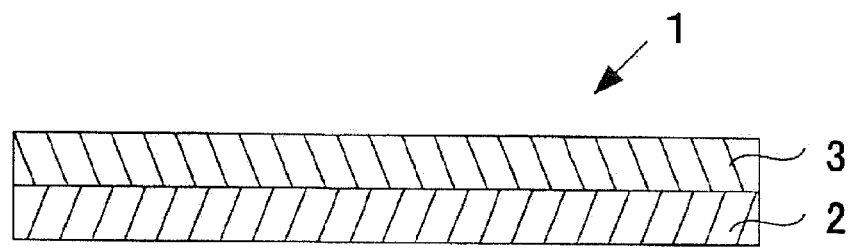
FIG. 1 is an illustrative view schematically showing the section of essential parts of a negative electrode for nonaqueous electrolyte secondary battery.

FIG. 1 is an illustrative view schematically showing the section of essential parts of a negative electrode 1 for nonaqueous electrolyte secondary battery (which may be sometimes referred to simply as "negative electrode 1" hereinafter) related to the present embodiment.

As shown in FIG. 1, the negative electrode 1 has a structure wherein an active material layer 3 is stacked on a current collector 2. In FIG. 1, although the active material layer 3 is shown as a single layer, it may be in the form of two or more layers. The configuration of the active material layer 3 is described in more detail below.

<Active Material Layer 3>

The negative electrode agent for non-aqueous electrolyte secondary batteries (which may be sometimes referred to as simply as "negative electrode agent" hereinafter) related to one embodiment of the invention contains, as main ingredients, at least a binder (binder), a negative electrode active material (which may be sometimes referred to simply as "active material" hereinafter), and a conductive aid. The active material layer 3 related to the present embodiment is formed by mixing these materials, or mixing the negative electrode agent with a solvent to form a coating solution for forming a negative electrode (a slurry for forming a negative electrode), and coating the coating solution on a current collector and drying.

(Binder)

The binder related to the representative embodiment contains two types of water-soluble polymers including a first water-soluble polymer having been subjected to crosslinking treatment and a second water-soluble polymer not having been subjected to crosslinking treatment. The first and second water-soluble polymers are, for example, those ones capable of mixing, respectively. The first water-soluble polymer may be sometimes called "high molecular weight binder" and the second water-soluble polymer that is lower in molecular weight than the first water-soluble polymer may be called "low molecular weight binder" hereinafter.

The two types of water-soluble polymers including the first water-soluble polymer and the second water-soluble polymer contain a carboxyl group, respectively. In the present embodiment, usable water-soluble polymers include, for example, alginic acid, carboxymethyl cellulose, chitosan derivatives (wherein part of the hydroxyl group is acetoxylated), hyaluronic acid, rosin acid polymers, polyacrylic acid, a copolymer of maleic acid and acrylic acid, or salts thereof. Especially, polyacrylic acid and its salts are preferred in view of their rich content of carboxyl group.

This is considered for the reason that because the first and second water-soluble polymers related to the present embodiment contain a large amount of carboxyl groups, the conductivity of Li ions is improved and the reductive decomposition of an electrolytic solution can be suppressed by suppressing the swelling of the electrolytic solution.

Further, the first and second water-soluble polymers are both a water-soluble, linear polymer.

The second water-soluble linear polymer is able to penetrate into the crosslinked network of the first water-soluble linear polymer thereby enabling an interpenetrating polymer network to be formed. This permits the formation of a binder that is able to appropriately control tensile strength and elongation, and is hard and is less likely to be broken down. More particularly, both the suppression of a volume change and the suppression of cracks can be better achieved.

When using a linear polycarboxylic acid salt as a first water-soluble polymer, such a water-soluble polymer, which has a high molecular weight beyond ensuring that water solubility is ordinarily obtained for use as a first water-soluble polymer, can be dissolved in water and used as a coating solution because of its high solubility in water. Hence, durability against internal stress at the time of volume expansion and shrinkage during charge and discharge cycles can be improved.

Further, the two types of water-soluble polymers including the first and second water-soluble polymers contain a carboxyl group, respectively. The first and second water-soluble polymers have a carboxyl group with adequate polarity and are thus soluble in water. When the first and second water-soluble polymers form an interpenetrating polymer network, hydrogen bonds are formed, respectively, and hydrogen bonds to the surface of an active material may also be formed. Accordingly, there can be obtained a satisfactory resistance to breakage during expansion and shrinkage cycles at the time of charge and discharge.

The first and second water-soluble polymers are described in more detail.

The active material layer 3 is preferably such that the second water-soluble polymer used is one that is lower in molecular weight than the first water-soluble polymer. For instance, the binder used therefor contain a polycarboxylic acid salt having a molecular weight of from 1,000,000 to 5,000,000 (high molecular weight) as a first water-soluble polymer and a polycarboxylic acid having a molecular weight of from 1,000 to 10,000 (which is lower than the polycarboxylic acid salt) as a second water-soluble polymer. If the first water-soluble polymer has a molecular weight of not less than 1,000,000, good durability against the internal stress at the time of volume expansion and shrinkage during charge and discharge of the active material layer 3 is readily obtained. If not larger than 5,000,000, solubility in water is favorably ensured. If the molecular weight of the second water-soluble polymer is 1,000 or over, the second water-soluble polymer is unlikely to be evaporated when dried after coating. The molecular weight of not larger than 10,000 favorably leads to the likelihood of adsorption on the surface of the active material layer.

The above molecular weight used may be an average molecular weight and can be measured according to GPC (gel permeation chromatography). Alternatively, when using other measuring methods, the molecular weight of the second water-soluble polymer and the molecular weight of the first water-soluble polymer can be compared with each other.

As stated above, in the present embodiment, the active material layer 3 has the binder made of a crosslinked polycarboxylic acid salt as a first water-soluble polymer, so that there can be improved durability against an internal stress at the time of volume expansion and shrinkage during charge and discharge of the active material layer, and the occurrence of cracks of the active material layer 3 can be suppressed. Because the crosslinked structure increases elasticity, a creep resistance characteristic can be improved, the strain caused by stress relaxation against an internal stress at the time of volume expansion during charge can be suppressed, and the active material layer can be returned to an original volume (or state) by the volume shrinkage during discharge. Eventually, the breakage of a conduction path is more suppressed and the charge and discharge cycle characteristics of battery are improved. That is, the lifetime characteristics of such a battery can be improved.

Since the second water-soluble polymer forms an interpenetrating polymer network along with the first water-soluble polymer, durability against an internal stress at the time of volume expansion and shrinkage during charge and discharge are improved. Accordingly, there can be used a polymer having a low molecular weight, which could not ensure durability against an internal stress at the time of volume expansion and shrinkage during charge and discharge cycle. If the molecular weight of the second water-soluble polymer is made low, the second water-soluble polymer is likely to be attached to the surface of an active material. Thus, the contact between the active material and an electrolytic solution is better prevented, and a stable film can be formed even if the volume of the active material is changed. This film can be expected as having action as SEI. As a result, the continuous breakage and formation of SEI during repeated charge and discharge can be suppressed thereby ensuring improved lifetime characteristics. Moreover, when a polycarboxylic acid salt used as a first water-soluble polymer and polycarboxylic acid used as a second water-soluble polymer are mixed, dehydrated condensation is caused to occur, so that the polycarboxylic acid salt and polycarboxylic acid undergo covalent bond formation, thereby leading to improved durability against the volume variation of the active material layer 3.

The polycarboxylic acid salts used as a first water-soluble polymer in the binder preferably include sodium salts, lithium salts, potassium salts, magnesium salts, calcium salts and the like of alginic acid, polyacrylic acid, acrylic acid-maleic acid copolymer, carboxymethyl cellulose and the like. Especially, polyacrylic acid salts are more preferred from the standpoint of improving the lifetime characteristics because of the rich content of carboxyl group therein, of which sodium polyacrylate is most preferred.

The polycarboxylic acids used as a second water-soluble polymer in the binder preferably include alginic acid, polyacrylic acid, acrylic acid-maleic acid copolymer, carboxymethyl cellulose and the like. In particular, the acrylic acid-maleic acid copolymer having a rich content of carboxyl group is more preferred. The content of the second water-soluble polymer is set at 0.1 mass % to 50 mass %, inclusive, relative to the total weight of the water-soluble polymers contained in the whole binder. If the content of the second water-soluble polymer is not less than 0.1 mass %, the second water-soluble polymer is well attached to the active material surface. If the content of the second water-soluble polymer is not larger than 50 mass %, there can be obtained adequate durability against an internal stress at the time of the volume expansion and shrinkage during charge and discharge of the active material layer 3 by the action of the crosslinked first water-soluble polymer. When the content of the second water-soluble polymer is not larger than 30 mass %, there is easily obtained a balance between the attachment of the second water-soluble polymer on the active material surface and the durability, imparted with the crosslinked first water-soluble polymer, against an internal stress at the time of volume expansion and shrinkage during charge and discharge of the active material layer 3. Hence, improved or even excellent battery characteristics are more readily obtained because of the retention of charge capacity by the attachment of the second water-soluble polymer on the active material surface and the increased suppression of cracks of the active material layer 3 with the aid of the crosslinked first water-soluble polymer as would otherwise occur due to an internal stress at the time of volume expansion during charge.

(Crosslinking Agent)

As to the crosslinking treatment and the crosslinking agent used therefor according to this embodiment, illustration is made wherein a polycarboxylic acid salt is used as a first water-soluble polymer and a polycarboxylic acid is used as a second water-soluble polymer, both contained in the binder of the active material layer 2 related to the present embodiment.

The crosslinking reaction of the polycarboxylic acid salt can be carried out using a crosslinking agent. As a crosslinking agent, there can be used, for example, those capable of forming crosslinkage by reaction with a carboxylic acid. In other words, a usable crosslinking agent related to the embodiment is one capable of forming a crosslinked structure by crosslinking reaction with a carboxyl group. The slurry for the formation of a negative electrode is usually prepared by dropping a crosslinking agent in a polymer aqueous solution containing a polycarboxylic acid and further mixing with a conductive aid and an active material. The crosslinking reaction of the polycarboxylic acid depends on the pH of the polymer aqueous solution, with which the reaction velocity is determined. When a crosslinking agent is dropped in a non-neutralized, acidic solution of the polycarboxylic acid, the reaction proceeds too rapidly to form a uniform crosslinked structure. To avoid this, a crosslinking agent is dropped in a fully neutralized, high-molecular-weight polymer aqueous solution such as of a polycarboxylic acid salt (e.g. an aqueous solution containing sodium polyacrylate) so as to allow the reaction to proceed gently, with the result that the crosslinking reaction is enabled to proceed uniformly. Subsequently, an acidic polymer solution such as of a polycarboxylic acid (e.g. an aqueous solution containing polyacrylic acid) is added, by which the reaction can be fully completed to prepare a polymer aqueous solution. In this way, the present embodiment makes use of a fully neutralized water-soluble polymer as a first water-soluble polymer and an acidic water-soluble polymer as a second water-soluble polymer, with which a uniform crosslinked structure can be formed and the crosslinking reaction can be completely finished thereby suppressing a change with time.

The amount of the crosslinking agent is preferably such that the crosslinking functional group of the crosslinking agent ranges from 0.1 mol % to 3.0 mol % relative to the carboxyl group of the polycarboxylic acid salt. If more than 0.1 mole %, a satisfactory degree of crosslinkage is more likely to be obtained. If not larger than 3.0 mole %, a conductive aid and an active material can be well dispersed.

The crosslinking agent is not specifically limited so far as an aqueous crosslinking agent, i.e. a water-soluble crosslinking agent, capable of reaction with a carboxylic acid is used. Although known agents may be used, it is preferred to use carbodiimide derivatives and aziridine derivatives, which are low in reactivity with moisture and cause a crosslinking reaction to be feasible within several minutes at room temperature. Alternatively, isocyanate crosslinking agents may also be used. Of the above-indicated materials, aziridine derivatives are more preferred. More particularly, 2,2-bishydroxymethylbutanol-tris[3-(1-aziridinyl)propionate is most preferred.

(Active Material)

The active material related to the present embodiment is not critical in type so far as it is able to reversibly absorb and release lithium, and known ones may be used. Preferably, materials capable of alloying with lithium are used. In particular, when using materials having a charge storage capacity greater than graphite, the significant effects of the embodiment can be obtained.

The materials capable of alloying with Li include, for example, one or more of metals selected from the group consisting of Si, Ge, Sn, Pb, Al, Ag, Zn, Hg and Au, or an alloy or an oxide thereof. Alloys include, for example, Si and Cu alloys, Si and Ni alloys, and the like. These metals, alloys, or oxides thereof are covered with an oxide on the surface thereof and are thus preferred because the carboxyl group of the second water-soluble polymer is more likely to be adsorbed.

Of the above-indicated materials, $SiO_x$ is preferred. More preferably, x is from 0 to 1.5, inclusive. If x is 1.5 or below, a satisfactory amount of absorption or release of Li is more ensured. Besides such active materials as indicated above, graphite may be added thereto as an active material. The addition of graphite enables the formation of an electrode that is reduced in irreversible capacity over an electrode made of $SiO_x$ alone.

(Conductive Aid)

Usable conductive aids related to the present embodiment include, for example, carbon black, natural graphite, artificial graphite, metal oxides such as titanium oxide, ruthenium oxide and the like, metal fibers, and the like. Of these, carbon black assuming a structural morphology is preferred. Especially, some kind of carbon black including furnace black, ketjen black or acetylene black (AB), is more preferred. It will be noted that a mixture of carbon black and other type of conductive aid such, for example, as vapor-grown carbon fibers (VGCF) is also preferred.

(Electrolytic Solution)

The solvents of an electrolytic solution used in a non-aqueous electrolyte secondary battery according to the present embodiment includes, for example, low-viscosity, chain carbonic acid esters such as dimethyl carbonate, diethyl carbonate and the like, high-permittivity cyclic carbonic acid esters such as ethylene carbonate, propylene carbonate, butylene carbonate and the like, γ-butyrolactone, 1,2-dimethoxyethane, tetrahydrofuran, 2-methyltetrahydrofuran, 1,3-dioxorane, methyl acetate, methyl propionate, vinylene carbonate, dimethylformamide, sulforane, and mixed solvents thereof.

The electrolyte contained in the electrolytic solution is not limited and known ones are usable including, for example, $LiClO_4$, $LiBF_4$, $LiAsF_6$, $LiPF_6$, $LiCF_3SO_3$, $LiN(CF_3SO_2)_2$, LiI, $LiAlCl_4$ and mixtures thereof. Preferably, a lithium salt of $LiBF_4$, $LiPF_6$ or a mixture thereof is used.

[Entire Configuration of Nonaqueous Electrolyte Secondary Battery]

The nonaqueous electrolyte secondary battery related to the present embodiment is now described briefly.

The nonaqueous electrolyte secondary battery related to the embodiment has a positive electrode, a negative electrode and an electrolytic solution. The negative electrode is a negative electrode for nonaqueous electrolyte secondary batteries formed by using such a negative electrode agent for nonaqueous electrolyte secondary batteries as set out above.

Effect of the Present Embodiment

The invention related to the present embodiment can have the following effects.

(1) The negative electrode agent for nonaqueous electrolyte secondary batteries related to this embodiment includes, at least, an active material and a binder wherein the binder contains a first water-soluble linear polymer and a second water-soluble linear polymer, the first water-soluble linear polymer being subjected to crosslinking treatment.

According to such an arrangement as described above, since the first water-soluble linear polymer is subjected to crosslinking treatment, not only an active material layer 3, which has higher durability against an internal stress at the time of volume expansion and shrinkage during charge and discharge, can be obtained, but also continuous breakage and formation of SEI entailed from the repetition of charge and discharge can be better suppressed. Hence, there can be provided a negative electrode agent for nonaqueous electrolyte secondary batteries, which is able to form a negative electrode 1 for nonaqueous electrolyte secondary batteries having improved or even excellent lifetime characteristics.

(2) The content of the second water-soluble polymer can be within a range of not less than 0.1 wt % to not larger than 50 wt % based on the total weight of the first and second water-soluble polymers contained in the binder of the embodiment.

According to such an arrangement as described above, the deposition of the binder on the active material surface leads to increased suppression of contact between the active material and an electrolytic solution, so that the continuous breakage and formation of SEI, caused by the repetition of charge and discharge, can be reliably better suppressed.

(3) The first water-soluble polymer and the second water-soluble polymer, both contained in the binder related to this embodiment, can contain a carboxyl group, respectively.

According to such an arrangement as described above, the first and second water-soluble polymers in combination are subjected to dehydration condensation to obtain an active material layer 3 that is higher in durability against an internal stress at the time of volume expansion and shrinkage during charge and discharge.

(4) The crosslinking treatment related to the embodiment may be carried out by use of a crosslinking agent. The amount of the crosslinking agent can be within a range of from 0.1 mol % to 3.0 mol %, inclusive, of the crosslinking functional group of the crosslinking agent relative to the carboxyl group of the high molecular weight binder.

According to such an arrangement as described above, while a conductive aid and an active material can be well dispersed, crosslinking can be facilitated.

(5) The first water-soluble polymer related to the embodiment is made of a polycarboxylic acid salt and the second water-soluble polymer related to the embodiment is made of a polycarboxylic acid, under which the first and second water-soluble polymers may be bonded together through dehydration condensation of the carboxyl groups.

According to such an arrangement as described above, the polycarboxylic acid salt of the first water-soluble polymer and the polycarboxylic acid of the second water-soluble polymer are mixed together and subjected to dehydration condensation to form covalent bonds between the polycarboxylic acid salt and the polycarboxylic acid. Therefore, there can be obtained an active material layer that has higher durability against an internal stress at the time of volume expansion and shrinkage during charge and discharge, and it is possible to better suppress continuous breakage and formation of SEI resulting from the repetition of charge and discharge. In this way, there can be provided a negative electrode agent capable of forming a negative electrode 1 for nonaqueous electrolyte secondary batteries having improved or even excellent lifetime characteristics.

(6) The second water-soluble polymer related to this embodiment can be a polycarboxylic acid.

This enables more proper formation of a binder.

(7) The first water-soluble polymer related to this embodiment can be a polycarboxylic acid salt.

According to such an arrangement as mentioned above, since the polycarboxylic acid salt is soluble in water and enables use as a first water-soluble linear polymer having a high molecular weight, it is more likely to increase durability against an internal stress at the time of volume expansion and shrinkage during charge and discharge of an active material layer 3, thereby ensuring more proper formation of a binder.

(8) The second water-soluble polymer related to the embodiment can be an acrylic acid-maleic acid copolymer.

This leads to more improved lifetime characteristics due to the increased dispersion of an active material.

(9) The first water-soluble polymer related to the embodiment can be a fully neutralized water-soluble polymer and the second water-soluble polymer related to this embodiment can be an acidic water-soluble polymer.

According to such an arrangement as mentioned above, the lifetime characteristics can be improved.

(10) The crosslinking treatment of the embodiment can be effected by use of a crosslinking agent. The crosslinking agent may contain at least one of a carbodiimide derivative, an isocyanate derivative and an aziridine derivative.

The use of such a crosslinking agent having a chemical structure stable to moisture as above enables water to be used as a solvent, which is preferred from a preparation standpoint.

According to such an arrangement as described above, the crosslinking reaction can be carried out even at room temperature with increased reliability.

(11) The crosslinking agent related to the embodiment can be an aziridine derivative.

According to such an arrangement as described above, the crosslinking reaction can be completed at room temperature within several minutes.

(12) The crosslinking agent related to the embodiment can be a carbodiimide derivative.

According to such an arrangement as described above, its toxicity is low and an environmental load can be reduced.

(13) The active material related to the embodiment should preferably be one covered with an oxide on the surface thereof because of the ease in adsorption of a carboxyl group. Especially, the material covered with an oxide on the surface thereof can be $SiO_x$ ($0 \leq x \leq 1.5$). When using $SiO_x$ ($0 \leq x \leq 1.5$), adsorption and release of Li can be satisfactorily secured in amount.

(14) The negative electrode 1 for nonaqueous electrolyte secondary batter related to the present embodiment includes a current collector 2 and an active material layer 3 formed on the current collector 2 wherein the active material layer 3 contains such a negative electrode for nonaqueous electrolyte secondary batteries as set out above.

According to such an arrangement as described above, since the first water-soluble polymer has been crosslinked, there can be obtained the active material layer 3 that is higher in durability against an internal stress at the time of volume expansion and shrinkage during charge and discharge, and the continuous breakage and formation of SEI resulting from the repetition of charge and discharge can be suppressed. This leads to the provision of the negative electrode 1 for nonaqueous electrolyte secondary batteries having improved or even excellent lifetime characteristics.

(15) The nonaqueous electrolyte secondary battery related to this embodiment includes a positive electrode, a negative electrode 1 and an electrolytic solution wherein the negative electrode 1 is composed of such a negative electrode for nonaqueous electrolyte secondary batteries as set forth above.

According such an arrangement as described above, since the first water-soluble polymer has been subjected to crosslinking treatment, there can be obtained an active material layer 3 that is higher in durability against an internal stress at the time of volume expansion and shrinkage during charge and discharge, and the continuous breakage and formation of SEI resulting from the repetition of charge and discharge can be better suppressed. This eventually leads to the provision of a nonaqueous electrolyte secondary battery provided with the negative electrode 1 having improved or even excellent lifetime characteristics.

First Example

The present invention is now described in more detail by way of first example, which should not be construed as limiting the invention thereto.

Example 1-1

<Positive Electrode>

24 g of acetylene black (HS-100, manufactured by Denka Co., Ltd.) and 41 g of NMP were added to 120 g of an N-methyl-2-pyrrolidone (NMP) solution of polyvinylidene fluoride (PVDF) (#7208, manufactured by Kureha Corporation), followed by agitation for 10 minutes by means of Highvismix.

Subsequently, 144 g of lithium nickel-cobalt manganate (NCM) (manufactured by Nihon Kagaku Sangyo Co., Ltd.) and 337 g of lithium manganate (LMO) (Type-F, manufactured by Mitsui Mining & Smelting Co., Ltd.) were added and agitated for 10 minutes. After confirming that the resulting ink was in a stiff state, it was kneaded for further 10 minutes.

Thereafter, an NMP solution was added for dilution so that a solid concentration (NV) was 60%. In this way, a slurry for the formation of positive electrode related to Example 1-1 was obtained.

The thus obtained slurry for positive electrode formation was coated onto a current collector 2. For the current collector 2, a 15 μm thick aluminum (Al) foil was used. The slurry for positive electrode formation was coated by use of a doctor blade at a coating weight of 18.8 mg/cm².

Subsequently, pre-drying was carried out at 120° C. for 30 minutes, followed by pressing so that the resulting density was 2.5 g/cm². Finally, reduced pressure drying was performed at 120° C. for 10 hours to obtain a positive electrode of Example 1-1.

<Negative Electrode>

0.56 g of linear sodium polyacrylate (manufactured by Nippon Shokubai Co., Ltd.) was added to 36.00 g of water, followed by agitation with a disper blade for dissolution in water. Subsequently, 0.01 g of an aziridine derivative (PZ-33, manufactured by Nippon Shokubai Co., Ltd.) was added to the polymer solution and agitated at room temperature for 20 minutes.

Subsequently, 0.14 g of linear polyacrylic acid (manufactured by Nippon Shokubai Co., Ltd.) was added to and dissolved in water under agitation. Further, 2.35 g of silicon oxide ($SiO_x$)(manufactured by OSAKA Titanium technologies Co., Ltd.) having a particle size D50 of 6.6 μm, 0.47 g of acetylene black (AB) and 0.47 g of vapor grown carbon fibers (VGCF) were added and agitated, followed by dispersion with Fill Mix to obtain a slurry for negative electrode formation related to Example 1-1.

The thus obtained slurry for negative electrode formation was coated onto a current collector 2. A 12 μm thick copper foil was used as the current collector 2. The slurry for negative electrode formation was coated by use of a doctor blade at a coating weight of 1.2 mg/cm².

Subsequently, pre-drying was carried out at 80° C. for 30 minutes, followed by pressing so that the resulting density was 1.0 g/cm². Finally, reduced pressure drying was performed at 105° C. for 5 hours to obtain a negative electrode of Example 1-1.

The thus obtained electrodes (positive and negative electrodes) were used to make a coin cell, and a cycle test was carried out.

Example 1-2

Positive Electrode

In the same manner as in Example 1-1-, a positive electrode related to Example 1-2 was made.
<Negative Electrode>
0.55 g of linear sodium polyacrylate (manufactured by Nippon Shokubai Co., Ltd.) was added to 36.00 g of water, followed by agitation with a disper blade for dissolution in water. Subsequently, 0.02 g of an aziridine derivative (PZ-33, manufactured by Nippon Shokubai Co., Ltd.) was added to the polymer solution and agitated at room temperature for 20 minutes.

Subsequently, 0.14 g of linear polyacrylic acid (manufactured by Nippon Shokubai Co., Ltd.) was added to and dissolved in water under agitation. Further, 2.35 g of silicon oxide ($SiO_x$)(manufactured by OSAKA Titanium technologies Co., Ltd.) having a particle size D50 of 6.6 μm, 0.47 g of acetylene black (AB) and 0.47 g of vapor grown carbon fibers (VGCF) were added and agitated, followed by dispersion with Fill Mix to obtain a slurry for negative electrode formation related to Example 1-1.

The thus obtained slurry for negative electrode formation was coated onto a current collector 2. A 12 μm thick copper foil was used as the current collector 2. The slurry for negative electrode formation was coated by use of a doctor blade at a coating weight of 1.2 mg/cm².

Subsequently, pre-drying was carried out at 80° C. for 30 minutes, followed by pressing so that the resulting density was 1.0 g/cm². Finally, reduced pressure drying was performed at 105° C. for 5 hours to obtain a negative electrode of Example 1-2.

The resulting electrodes (positive and negative electrodes) were used to make a coin cell, and a cycle evaluation as in Example 1-1 was carried out.

Example 1-3

<Positive Electrode>
In the same manner as in Example 1-1, a positive electrode related to Example 1-3 was made.
<Negative Electrode>
0.54 g of linear sodium polyacrylate (manufactured by Nippon Shokubai Co., Ltd.) was added to 36.00 g of water, followed by agitation with a disper blade for dissolution in water. Subsequently, 0.03 g of an aziridine derivative (PZ-33, manufactured by Nippon Shokubai Co., Ltd.) was added to the polymer solution and agitated at room temperature for 20 minutes.

Subsequently, 0.14 g of linear polyacrylic acid (manufactured by Nippon Shokubai Co., Ltd.) was added and agitated. Further, 2.35 g of $SiO_x$ (manufactured by Osaka Titanium Technologies Co., Ltd.) having a particle size D50 of 6.6 μm, 0.47 g of AB and 0.47 g of VGCF were added and agitated, followed by actual dispersion with Fill Mix to obtain a slurry for negative electrode formation related to Example 1-3.

The thus obtained slurry for negative electrode formation was coated onto a current collector 2. A 12 μm thick copper foil was used as the current collector 2. The slurry for negative electrode formation was coated by use of a doctor blade at a coating weight of 1.2 mg/cm².

Subsequently, pre-drying was carried out at 80° C. for 30 minutes, followed by pressing so that the resulting density was 1.0 g/cm². Finally, reduced pressure drying was performed at 105° C. for 5 hours to obtain a negative electrode of Example 1-3.

The resulting electrodes (positive and negative electrodes) were used to make a coin cell, and a cycle evaluation as in Example 1-1 was carried out.

Comparative Example 1-1

<Positive Electrode>
A positive electrode related to Comparative Example 1-1 was made in the same manner as in Example 1-1.
<Negative Electrode>
1.26 g of sodium alignate (manufactured by Kikkoman Biochemifa Co., Ltd.) was added to 52.89 g of water and agitated by means of a disper blade. Subsequently, 4.22 g of $SiO_x$ (manufactured by Osaka Titanium Technologies Co., Ltd.), 0.85 g of AB and 0.84 g of VGCF were added and agitated, followed by actual dispersion with Fill Mix to obtain a slurry for negative electrode formation related to Comparative Example 1-1.

The thus obtained slurry for negative electrode formation was coated onto a current collector 2. A 12 μm thick copper foil was used as the current collector 2. The slurry for negative electrode formation was coated by use of a doctor blade at a coating weight of 1.2 mg/cm².

Subsequently, pre-drying was carried out at 80° C. for 30 minutes, followed by pressing so that the resulting density was 1.0 g/cm². Finally, reduced pressure drying was performed at 105° C. for 5 hours to obtain a negative electrode of Comparative Example 1-1.

The resulting electrodes (positive and negative electrodes) were used to make a coin cell, and a cycle evaluation as in Example 1-1 was carried out.

(Making and Evaluation of Cell)

Using the negative electrodes and the positive electrode, coil cells were made and subjected to charge and discharge evaluation of Examples 1-1, 1-2 and 1-3 and Comparative Example 1-1. 100 or 300 charge and discharge cycles were repeated at a charge rate of 508 mA/g and a discharge rate of 2560 mA/g within a voltage range of 3V-4.25V, thereby evaluating the cycles. The retention rate was calculated in terms of the formula: (discharge capacity at the 100th cycle or 300th cycle)/(discharge capacity at the first cycle)×100. The coin cell used was of the 2032 type (Model CR 2032 with a diameter of 20.0 mm and a height of 3.2 mm). The negative electrode was punched into a circular disk having a diameter of 15 mm, and the positive electrode was also punched into a circular disk having a diameter of 13.5 mm, under which evaluation was made. The coil cell had a fundamental configuration including a negative electrode 1, a positive electrode and a separator (Highpore ND525, manufactured by Asahi Kasei Corporation). The electrolytic solution used was one wherein LiPF6 was added at 1 M to a mixed solvent of ethylene carbonate (EC) and diethyl carbonate (DEC) at 3:7 (v/v), which contained 5 mass % of fluoroethylene carbonate.

Figure 2:
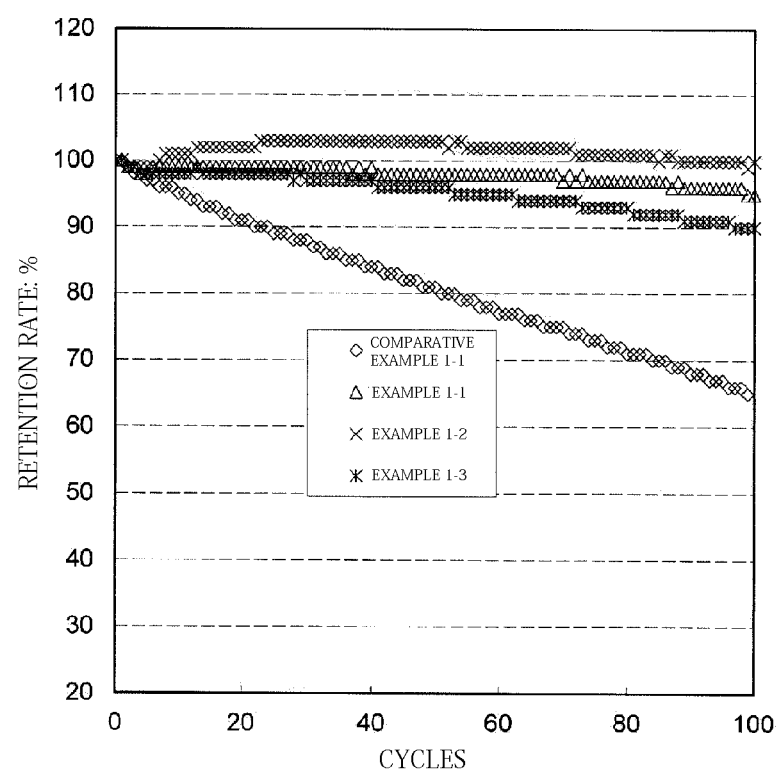
FIG. 2 shows the results of a cycle test of negative electrodes using mixed binders of crosslinked binders of high molecular weight and non-crosslinked binders of low molecular weight.

FIG. 2 shows the results of the cycle test of the negative electrodes making use of the mixed binders of the cross-linked high molecular weight binders (first water-soluble polymer) and the low molecular weight binder (second water-soluble polymer). The results shown in FIG. 2 are summarized in Table 1. The cycle characteristics of Examples 1-1 and 1-2 are better in retention rate than that of Comparative Example 1-1. On the other hand, with Example 1-3 using the treatment with 3.4 mol % of the crosslinking agent, the retention rate was slightly lower than in the case of Comparative Example 1-1.

From the above results, it will be seen that the combination of a high molecular weight binder made of a water-soluble polymer material crosslinked with an appropriate amount of crosslinking agent and a low molecular weight binder made of a non-crosslinked water-soluble polymer material contributes to improving the retention rate of the negative electrode for the nonaqueous electrolyte secondary cell.

TABLE 1

| Sample | Crosslinking agent (mol %) | Capacity before cycle test mAhg$^{-1}$ (active material) | Capacity after cycle test mAhg$^{-1}$ (active material) | Retention rate (%) |
| --- | --- | --- | --- | --- |
| Comparative Example 1-1 | 0 | 982 | 637 | 65 |
| Example 1-1 | 0.7 | 1038 | 989 | 95 |
| Example 1-2 | 2.0 | 920 | 915 | 99 |
| Example 1-3 | 3.4 | 954 | 860 | 90 |

Second Example

The invention is described in more detail by way of Example 2, which should not be construed as limiting the invention thereto.

Example 2-1

<Positive Electrode>

24 g of acetylene black (HS-100, manufactured by Denka Co., Ltd.) and 41 g of NMP were added to 120 g of an N-methyl-2-pyrrolidone (NMP) solution of polyvinylidene (PVDF) (#7208, manufactured by Kureha Corporation), followed by agitation for 10 minutes by means of Highvis-mix.

Subsequently, 144 g of lithium nickel-cobalt manganate (NMC) (manufactured by Nihon Kagaku Sangyo Co., Ltd.) and 337 g of lithium manganate (LMO) (Type-F, manufactured by Mitsui Mining & Smelting Co., Ltd.) were added and agitated for 10 minutes. After confirming that the resulting ink was in a stiff state, it was kneaded for further 10 minutes.

Thereafter, an NMP solution was added for dilution so that a solid concentration (NV) was adjusted at 60%. In this way, a slurry for the formation of positive electrode related to Example 2-1 was obtained.

The thus obtained slurry for positive electrode formation was coated onto a current collector 2. For the current collector 2, a 15 µm thick aluminum (Al) foil was used. The slurry for positive electrode formation was coated by use of a doctor blade at a coating weight of 18.8 mg/cm$^2$.

Subsequently, pre-drying was carried out at 120° C. for 30 minutes, followed by pressing so that the resulting density was 2.5 g/cm$^2$. Finally, reduced pressure drying was performed at 120° C. for 10 hours to obtain a positive electrode of Example 2-1.

<Negative Electrode>

0.56 g of linear sodium polyacrylate (with a molecular weight of 5,000,000, manufactured by Nippon Shokubai Co., Ltd.) was added to 36.00 g of water, followed by agitation with a disper blade for dissolution in water. Subsequently, 0.01 g of an aziridine derivative (PZ-33, manufactured by Nippon Shokubai Co., Ltd.) was added to the polymer solution and agitated at room temperature for 20 minutes.

Subsequently, 0.14 g of linear polyacrylic acid (manufactured by Nippon Shokubai Co., Ltd.) was added to and dissolved in water under agitation. Further, 2.35 g of silicon oxide (SiO$_x$) (manufactured by OSAKA Titanium Technologies Co., Ltd.), 0.47 g of acetylene black (AB) and 0.47 g of vapor grown carbon fibers (VGCF) were added and agitated, followed by actual dispersion with Fill Mix to obtain a slurry for negative electrode formation related to Example 2-1.

The thus obtained slurry for negative electrode formation was coated onto a current collector 2. A 12 µm thick copper foil was used as the current collector 2. The slurry for negative electrode formation was coated by use of a doctor blade at a coating weight of 1.2 mg/cm$^2$.

Subsequently, pre-drying was carried out at 80° C. for 30 minutes, followed by pressing so that the resulting density was 1.0 g/cm$^2$. Finally, reduced pressure drying was performed at 105° C. for 5 hours to form an active material layer 3 having a binder containing the crosslinked polycarboxylic acid salt having a molecular weight ranging from 1,000,000 to 5,000,000 and the non-crosslinked polycarboxylic acid. The binder of the active material layer 3 was one formed by dehydration condensation of the polycarboxylic acid salt and the polycarboxylic acid. In this way, a negative electrode 1 related to Example 2-1 was obtained.

The thus obtained electrodes (positive and negative electrodes) were used to make a coin cell for cycle evaluation.

Example 2-2

<Negative Electrode>

0.56 g of linear sodium polyacrylate (with a molecular weight of 5,000,000, manufactured by Nippon Shokubai Co., Ltd.) was added to 35.95 g of water, followed by agitation with a disper blade for dissolution in water. Subsequently, 0.08 g of an aqueous solution of 10% aziridine derivative (PZ-33, manufactured by Nippon Shokubai Co., Ltd.) was added to the polymer solution and agitated at room temperature for 20 minutes.

Subsequently, 0.14 g of linear polyacrylic acid (with a molecular weight of 5,000, manufactured by Wako Pure Chemical Industries, Ltd.) was added to and dissolved in water under agitation. Further, 2.36 g of SiO$_x$ (manufactured by Osaka Titanium technologies Co., Ltd.), 0.47 g of AB and 0.47 g of VGCF were added and agitated, followed by actual dispersion with Fill Mix to obtain a slurry for negative electrode formation related to Example 2-2.

The thus obtained slurry for negative electrode formation was coated onto a current collector 2. A 12 µm thick copper foil was used as the current collector 2. The slurry for negative electrode formation was coated by use of a doctor blade at a coating weight of 1.2 mg/cm$^2$.

Subsequently, pre-drying was carried out at 80° C. for 30 minutes, followed by pressing so that the resulting density was 1.0 g/cm$^2$. Finally, reduced pressure drying was performed at 105° C. for 5 hours to form an active material layer 3 having a binder containing the crosslinked polycarboxylic acid salt having a molecular weight of from 1,000,000 to 5,000,000 and the non-crosslinked polycarboxylic acid having a molecular weight of from 1000 to 10,000. The binder of the active material layer 3 was one bonded by dehydration condensation of the polycarboxylic acid salt and the polycarboxylic acid. In this way, a negative electrode 1 related to Example 2-2 was obtained.

<Positive Electrode>

It should be noted the positive electrode related to Example 2-2 was one made in a similar manner as in Example 2-1.

The thus obtained electrodes (positive and negative electrodes) were used to provide a coin cell, and a cycle evaluation was made in the same manner as in Example 2-1.

Example 2-3

<Negative Electrode>

0.56 g of linear sodium polyacrylate (manufactured by Nippon Shokubai Co., Ltd.) was added to 35.81 g of water, followed by agitation with a disper blade for dissolution in water. Subsequently, 0.07 g of an aqueous solution of 10% aziridine derivative (PZ-33, manufactured by Nippon Shokubai Co., Ltd.) was added to the polymer solution and agitated at room temperature for 20 minutes.

Subsequently, 0.28 g of an aqueous solution of 50% linear acrylic acid/maleic acid copolymer (with a molecular weight of 3,000, manufactured by Sigma-Aldrich Corporation) was added under agitation and dissolved in water. Further, 2.35 g of $SiO_x$ (manufactured by Osaka Titanium technologies Co., Ltd.), 0.47 g of AB and 0.47 g of VGCF were added and agitated, followed by actual dispersion with Fill Mix to obtain a slurry for negative electrode formation related to Example 2-3.

The thus obtained slurry for negative electrode formation was coated onto a current collector 2. A 12 μm thick copper foil was used as the current collector 2. The slurry for negative electrode formation was coated by use of a doctor blade at a coating weight of 1.2 mg/cm².

Subsequently, pre-drying was carried out at 80° C. for 30 minutes, followed by pressing so that the resulting density was 1.0 g/cm². Finally, reduced pressure drying was performed at 105° C. for 5 hours to form an active material layer 3 having a binder containing the crosslinked polycarboxylic acid salt having a molecular weight of from 1,000,000 to 5,000,000 and the non-crosslinked polycarboxylic acid having a molecular weight of from 1000 to 10,000. The binder of the active material layer 3 was one bonded by dehydration condensation of the polycarboxylic acid salt and the polycarboxylic acid. Thus, a negative electrode 1 related to Example 2-3 was obtained.

<Positive Electrode>

It will be noted that the positive electrode related to Example 2-3 was made in the same manner as in Example 2-1.

The electrodes (positive and negative electrodes) obtained in this way were used to make a coin cell, which was subjected to cycle evaluation in the same way as in Example 2-1.

Example 2-4

<Negative Electrode>

0.57 g of linear sodium polyacrylate (manufactured by Nippon Shokubai Co., Ltd.) was added to 35.96 g of water, followed by agitation with a disper blade for dissolution in water. Subsequently, 0.08 g of an aqueous solution of 10% aziridine derivative (PZ-33, manufactured by Nippon Shokubai Co., Ltd.) was added to the polymer solution and agitated at room temperature for 20 minutes.

Subsequently, 0.14 g of linear polyacrylic acid (with a molecular weight of 250,000, manufactured by Wako Pure Chemical Industries, Ltd.) was added and agitated for dissolution in water. Further, 2.35 g of $SiO_x$ (manufactured by Osaka Titanium technologies Co., Ltd.), 0.47 g of AB and 0.46 g of VGCF were added and agitated, followed by actual dispersion with Fill Mix to obtain a slurry for negative electrode formation related to Example 2-4.

The thus obtained slurry for negative electrode formation was coated onto a current collector 2. A 12 μm thick copper foil was used as the current collector 2. The slurry for negative electrode formation was coated by use of a doctor blade at a coating weight of 1.2 mg/cm2.

Subsequently, pre-drying was carried out at 80° C. for 30 minutes, followed by pressing so that the resulting density was 1.0 g/cm². Finally, reduced pressure drying was performed at 105° C. for 5 hours to obtain a negative electrode 1 related to Example 2-4.

<Positive Electrode>

It will be noted that the positive electrode related to Example 2-4 was made in the same manner as in Example 2-1.

The electrodes (positive and negative electrodes) obtained in this way were used to make a coin cell, which was subjected to cycle evaluation in the same way as in Example 2-1.

Example 2-5

<Negative Electrode>

0.56 g of linear sodium polyacrylate (manufactured by Nippon Shokubai Co., Ltd.) was added to 35.96 g of water, followed by agitation with a disper blade for dissolution in water. Subsequently, 0.06 g of an aqueous solution of 10% aziridine derivative (PZ-33, manufactured by Nippon Shokubai Co., Ltd.) was added to the polymer solution and agitated at room temperature for 20 minutes.

Subsequently, 0.15 g of linear polyacrylic acid (with a molecular weight of 1,000,000, manufactured by Wako Pure Chemical Industries, Ltd.) was added and agitated for dissolution in water. Further, 2.36 g of $SiO_x$ (manufactured by Osaka Titanium technologies Co., Ltd.), 0.48 g of AB and 0.49 g of VGCF were added and agitated, followed by actual dispersion with Fill Mix to obtain a slurry for negative electrode formation related to Example 2-5.

The thus obtained slurry for negative electrode formation was coated onto a current collector 2. A 12 μm thick copper foil was used as the current collector 2. The slurry for negative electrode formation was coated by use of a doctor blade at a coating weight of 1.2 mg/cm2.

Subsequently, pre-drying was carried out at 80° C. for 30 minutes, followed by pressing so that the resulting density was 1.0 g/cm². Finally, reduced pressure drying was performed at 105° C. for 5 hours to obtain a negative electrode 1 related to Example 2-5.

<Positive Electrode>

It will be noted that the positive electrode related to Example 2-5 was made in the same manner as in Example 2-1.

The electrodes (positive and negative electrodes) obtained in this way were used to make a coin cell, which was subjected to cycle evaluation in the same way as in Example 2-1.

Example 2-6

<Negative Electrode>

0.57 g of linear sodium polyacrylate (manufactured by Nippon Shokubai Co., Ltd.) was added to 35.76 g of water, followed by agitation with a disper blade for dissolution in water. Subsequently, 0.07 g of an aqueous solution of 10% aziridine derivative (PZ-33, manufactured by Nippon Shokubai Co., Ltd.) was added to the polymer solution and agitated at room temperature for 20 minutes.

Subsequently, 0.37 g of a 40% aqueous solution of a sodium salt of linear acrylic acid/maleic acid copolymer (with a molecular weight of 50,000, manufactured by Nippon Shokubai Co., Ltd.) was added and agitated for dissolution in water. Further, 2.37 g of $SiO_x$ (manufactured by Osaka Titanium Technologies Co., Ltd.), 0.47 g of AB and 0.47 g of VGCF were added and agitated, followed by actual dispersion with Fill Mix to obtain a slurry for negative electrode formation related to Example 2-6.

The thus obtained slurry for negative electrode formation was coated onto a current collector 2. A 12 μm thick copper foil was used as the current collector 2. The slurry for negative electrode formation was coated by use of a doctor blade at a coating weight of 1.2 mg/cm².

Subsequently, pre-drying was carried out at 80° C. for 30 minutes, followed by pressing so that the resulting density was 1.0 g/cm³. Finally, reduced pressure drying was performed at 105° C. for 5 hours to obtain a negative electrode 1 related to Example 2-6.

<Positive Electrode>

It will be noted that the positive electrode related to Example 2-6 was made in the same manner as in Example 2-1.

The electrodes (positive and negative electrodes) obtained in this way were used to make a coin cell, which was subjected to cycle evaluation in the same way as in Example 2-1.

(Making and Evaluation of Cell)

Using the negative electrodes 1 and the positive electrode, coil cells were made and subjected to the charge and discharge evaluation of Examples 2-1, 2-2, 2-3, 2-4, 2-5 and 2-6. The making and evaluation of the cells were effected in the same manner as in the case of the foregoing first example, so the description therefor will be omitted herein.

The results of the evaluation are shown in Tables 2, 3 and 4.

TABLE 2

| | Capacity before cycle test $mAhg^{-1}$ (active material) | Capacity after cycle test $mAhg^{-1}$ (active material) | Retention rate (after 100 cycles) (%) |
|---|---|---|---|
| Example 2-1 | 1038 | 989 | 95 |
| Comparative Example 1-1 | 982 | 637 | 65 |

TABLE 3

| | Capacity before cycle test $mAhg^{-1}$ (active material) | Capacity after 100 cycles $mAhg^{-1}$ (active material) | Capacity after 300 cycles $mAhg^{-1}$ (active material) | Retention rate (after 100 cycles) (%) | Retention rate (after 100 cycles) (%) |
|---|---|---|---|---|---|
| Example 2-2 | 1057 | 967 | 793 | 92 | 75 |
| Example 2-4 | 1091 | 1015 | 810 | 93 | 74 |
| Example 2-5 | 1096 | 967 | 761 | 88 | 69 |

TABLE 4

| | Capacity before cycle test $mAhg^{-1}$ (active material) | Capacity after 100 cycles $mAhg^{-1}$ (active material) | Capacity after 300 cycles $mAhg^{-1}$ (active material) | Retention rate (after 100 cycles) (%) | Retention rate (after 100 cycles) (%) |
|---|---|---|---|---|---|
| Example 2-3 | 1083 | 1037 | 857 | 96 | 79 |
| Example 2-6 | 1085 | 983 | 796 | 91 | 73 |

In Table 2, Example 2-1 and Comparative Example 1-1 are compared with each other. In Example 2-1, the mixed binder made of first water-soluble polymer and the second water-soluble polymer is used wherein the first water-soluble polymer is crosslinked. In Comparative Example 1-1, the binder differs in that it is made only of the first water-soluble polymer and the first water-soluble polymer is not crosslinked. From Table 2, it is revealed that Example 2-1 is improved in the retention rate and also in the lifetime characteristics.

This is considered for the reason that in Example 2-1, the electrode structure is reinforced by the formation of an interpenetrating polymer network of the crosslinked, linear first water-soluble polymer with the second water-soluble polymer.

Table 3 shows the comparison among Examples 2-2, 2-4 and 2-5. Although Examples 2-2, 2-4 and 2-5 are the same in that there is used the mixed binder of the crosslinked binder of the first water-soluble polymer and the non-crosslinked binder of the second water-soluble polymer, they differ from one another in that the molecular weight of the second water-soluble polymer is 5,000 in Example 2-2, the molecular weight of the second water-soluble polymer is 250,000 in Example 2-4, and the molecular weight of the second-soluble polymer is 1,000,000 in Example 2-5. Therefore, it will be seen from Table 3 that with Example 2-2 wherein the water-soluble polymer (polycarboxylic acid) having a molecular weight of from 1,000 to 10,000 is contained, since the molecular weight of non-crosslinked binder used as the second water-soluble polymer is lowered, the binder coverage rate on the active material is improved along with improved lifetime characteristics.

In Table 4, Examples 2-3 and 2-6 are compared with each other. Examples 2-3 and 2-6 are the same in that the mixed binders of the crosslinked, first water-soluble polymer and the non-crosslinked, second water-soluble polymers are used. They differ in that Example 2-3 makes use of the acrylic acid/maleic acid copolymer as a polycarboxylic acid of the second water-soluble polymer, and Example 2-6 makes use, as a polycarboxylic acid of the second water-soluble polymer, of the sodium salt of acrylic acid/maleic acid copolymer. The acrylic acid/maleic acid copolymer has a larger number of carboxyl groups than the polyacrylic acid, ensuring a better binder coverage rate on the active material. The difference between Examples 2-3 and 2-6 resides in whether the neutralized binder is mixed with the crosslinked binder used as the first water-soluble polymer, or whether an acidic binder (acrylic acid/maleic acid copolymer) is mixed therewith. From Table 4, it will be seen that with Example 2-3 wherein the acidic binder (acrylic acid/maleic acid copolymer) is mixed, the retention rate is improved and the lifetime characteristics are also improved. This is considered due to the covalent bond through dehydration condensation of the two types of binders.

It will be noted that when negative electrodes 1 were made in the same manner as in Example 2-1 using combinations of a crosslinked polycarboxylic acid salt having a molecular weight of 1,000,000, a crosslinked polycarboxylic acid salt having a molecular weight of 1,000, a non-crosslinked polycarboxylic acid having a molecular weight of 1,000 and a non-crosslinked polycarboxylic acid having a molecular weight of not larger than 10,000 within a range of the present invention, similar results as in Example 2-1 were obtained.

The invention has been illustrated above with reference to specific embodiments, which should not be construed as limiting the invention thereto. Other modifications of the invention may become apparent to those skilled in the art along with the illustrated embodiments by reference to the illustration of the invention. These variations or embodiments within the scope and spirit of the invention should be embraced within the purview of the invention.

With respect to negative electrodes for nonaqueous electrolyte secondary batteries, which are not provided with the binder related to the embodiments of the invention, illustration is made briefly for comparison.

In recent years, attention has been paid to nonaqueous electrolyte secondary batteries (e.g. Li ion secondary batteries) as a repeatedly rechargeable secondary battery so as to aim at the saving of the quantity of petroleum and the reduction of greenhouse effect gases and also at the diversification and efficiency of energy infrastructure. Especially, the application and development of the batteries for use in electric cars, hybrid electric cars and fuel cell vehicles have been expected. In electric cars, an improvement in cruising distance has been required, and the high energy densification of Li ion secondary batteries will be much more required.

When looking at the negative electrode of existing Li ion secondary batteries, a graphite electrode has been ordinarily employed. The theoretical capacity of graphite is 372 $Ahg^{-1}$ (active material). Now, Si and Sn have drawn attention as an active material that shows a capacity higher than graphite. The theoretical capacity of Si is 4200 $mAhg^{-1}$ (active material), and that of Sn is 990 $mAhg^{-1}$ (active material). However, since the capacity of Si is about eleven times larger than graphite, the volume change resulting from the absorption and release of Li increases. For instance, the volume increases to about four times greater by absorption of Li. The electrode of an active material (Si or Sn) having a greater capacity than graphite undergoes a great volume change caused by charge and discharge, with concern of the disconnection of a conduction path of the electrode, its separation from the electrode due to breakage into fine pieces, and the peeling-off between a current collector and an active material layer. This may cause the factor of lowering the lifetime characteristics of the resulting Li ion secondary battery.

Other factor of causing the lifetime characteristics of the Li ion secondary battery includes the consumption of Li resulting from the formation of electrolytic solution-derived SEI. The Si-based active material that causes a great volume change resulting from charge and discharge undergoes repeated breakage and formation of SEI, so that the consumption of Li accompanied by the formation of SEI cannot be negligible.

In PTL 1, it is disclosed that the surface of a metal active material is covered with a material containing repeating units of alkylene oxide thereby suppressing the capacity fading. This is on the assumption that the coverage of the surface of the metal active material inhibits the reductive decomposition of an electrolytic solution. However, the problems on the disconnection of a conduction path of the electrode caused by the volume change of the active material layer, the separation from the electrode resulting from the breakage into fine pieces, and the peeling-off between a current collector and the active material layer cannot be solved. Thus, satisfactory lifetime characteristics cannot be obtained.

In PTL 2, it is disclosed that when using a crosslinked polyacrylic acid is used as a binder, the resulting electrode structure is more unlikely to be broken down than in the case of a non-crosslinked polyacrylic acid. However, where the crosslinked polyacrylic acid is used as a binder, the rate of covering fine irregularities and pores on or in the Si-based active material surface with the binder lowers. The decomposition of an electrolytic solution accompanied by the consumption of Li ions is liable to occur, thereby lowering the retention rate as a battery and thus, satisfactory lifetime characteristics cannot be obtained.

INDUSTRIAL APPLICABILITY

The negative electrode of nonaqueous electrolyte secondary batteries related to the invention can be used as an electrode for electric sources of a variety of portable electronic devices, drive batteries of electric cars which require a high energy density, electric storage devices of a variety of energies such as solar energy, wind generator energy and the like, and electric storage sources of domestic electric appliances.

REFERENCE SIGNS LIST 1 negative electrode of nonaqueous electrolyte secondary battery
2 current collector
3 active material layer.

What is claimed is:

1. A negative electrode agent for nonaqueous electrolyte secondary batteries prepared by
  drying an aqueous dispersion comprising an active material, which is dispersed in water, and a binder, which is dissolved in water;
  wherein the binder contains a) a crosslinked polymer formed by crosslinking a first water-soluble, linear polymer, which is a polycarboxylic acid salt, and b) a second water-soluble, linear polymer, which is a polycarboxylic acid, wherein a molecular weight of the first water-soluble, linear polymer is higher than a molecular weight of the second water-soluble, linear polymer.

2. The negative electrode agent for nonaqueous electrolyte secondary batteries of claim 1, wherein the content of the second water-soluble polymer relative to the total weight of the water-soluble polymers contained in the binder is within a range of from 0.1 wt % to 50 wt %.

3. The negative electrode agent for nonaqueous electrolyte secondary batteries of claim 1, wherein the crosslinking the first water-soluble polymer is carried out by use of a crosslinking agent wherein an amount of the crosslinking agent is within a range of from 0.1 mol % to 3.0 mol % of a crosslinking functional group of the crosslinking agent relative to the carboxyl group of the first water-soluble polymer.

4. The negative electrode agent for nonaqueous electrolyte secondary batteries of claim 1, wherein the first and second water-soluble polymer are bonded through dehydration condensation of the carboxyl groups thereof.

5. The negative electrode agent for nonaqueous electrolyte secondary batteries of claim 1, wherein the second water-soluble polymer is polyacrylic acid.

6. The negative electrode agent for nonaqueous electrolyte secondary batteries of claim 1, wherein the first water-soluble polymer is sodium polyacrylate.

7. The negative electrode agent for nonaqueous electrolyte secondary batteries of claim 1, wherein the second water-soluble polymer is acrylic acid/maleic acid copolymer.

8. The negative electrode agent for nonaqueous electrolyte secondary batteries of claim 1, wherein the crosslinking treatment is carried out by use of a crosslinking agent, and the crosslinking agent contains at least one member of a carbodiimide derivative, an isocyanate crosslinking agent and an aziridine derivative.

9. The negative electrode agent for nonaqueous electrolyte secondary batteries of claim 8, wherein the crosslinking agent contains an aziridine derivative.

10. The negative electrode agent for nonaqueous electrolyte secondary batteries of claim 1, wherein the active material contains $SiO_x$, wherein $0 \leq x \leq 1.5$.

11. A negative electrode for nonaqueous electrolyte secondary batteries comprising: a current collector, and an active material layer formed on the current collector, wherein the active material layer comprises the negative electrode agent for nonaqueous electrolyte secondary batteries of claim 1.

12. A nonaqueous electrolyte secondary battery comprising: a positive electrode, a negative electrode and an electrolytic solution, wherein the negative electrode comprises the negative electrode agent for nonaqueous electrolyte secondary batteries of claim 11.

13. The negative electrode agent for nonaqueous electrolyte secondary batteries of claim 1, wherein the molecular weight of the first water-soluble, linear polymer is from 1,000,000 to 5,000,000 and the molecular weight of the second water-soluble, linear polymer is from 1,000 to 10,000.

14. The negative electrode agent for nonaqueous electrolyte secondary batteries of claim 1, wherein the molecular weight of the first water-soluble, linear polymer is about 5,000,000.

15. A negative electrode agent for nonaqueous electrolyte secondary batteries prepared by
drying an aqueous dispersion comprising an active material, which is dispersed in water, and a binder, which is dissolved in water;
wherein the binder contains a) a crosslinked polymer formed by crosslinking a first water-soluble, linear polymer, which is a polycarboxylic acid salt, and b) a second water-soluble, linear polymer, which is a polycarboxylic acid, wherein a molecular weight of the first water-soluble, linear polymer is higher than a molecular weight of the second water-soluble, linear polymer and wherein the molecular weight of the second water-soluble, linear polymer is from 1,000 to 10,000.

16. A negative electrode agent for nonaqueous electrolyte secondary batteries prepared by
drying an aqueous dispersion comprising an active material, which is dispersed in water, and a binder, which is dissolved in water;
wherein the binder contains a) a crosslinked polymer formed by crosslinking a first water-soluble, linear polymer, which is a polycarboxylic acid salt, and b) a second water-soluble, linear polymer, which is a polycarboxylic acid, wherein a molecular weight of the first water-soluble, linear polymer is higher than a molecular weight of the second water-soluble, linear polymer, wherein the active material contains $SiO_x$, $0 \leq x \leq 1.5$, while not containing a graphite.

* * * * *